United States Patent [19]

Hulls

[11] Patent Number: 4,570,033
[45] Date of Patent: Feb. 11, 1986

[54] POLYPHASE DIGITIZER

[75] Inventor: Leonard R. Hulls, North Falmouth, Mass.

[73] Assignee: Numonics Corporation, Lansdale, Pa.

[21] Appl. No.: 544,615

[22] Filed: Oct. 24, 1983

Related U.S. Application Data

[63] Continuation-in-part of Ser. No. 530,560, Sep. 9, 1983, abandoned.

[51] Int. Cl.⁴ .............................................. G08C 21/00
[52] U.S. Cl. ...................................... 178/19; 323/218
[58] Field of Search ...................... 307/3, 4, 72, 73, 75; 340/870.31; 178/18, 19; 324/239; 318/687; 323/212, 218

[56] References Cited

U.S. PATENT DOCUMENTS 3,211,993 10/1965 Golden et al. ........................ 323/218
3,940,676 2/1976 Dudley ............................ 318/687 X
4,014,015 3/1977 Gundlach ........................ 340/870.31

Primary Examiner—Stafford D. Schreyer
Attorney, Agent, or Firm—Paul & Paul

[57] ABSTRACT

A two dimensional digitizing system comprises two systems at right angles to each other, comprising two conducting grid structures each having three terminals A, B, and C, with the grid conductors running parallel to the X axis in one system and the Y axis in the other, and a cursor coil. When the cursor coil is excited with an alternating current, voltages $e_{ab}$, $e_{bc}$ and $e_{ca}$ are induced between the terminal pairs AB, BC and CA respectively, whose amplitudes are functions of the position of the cursor coil relative to a cartesian co-ordinate system defined by said X and Y axes.

The voltages $e_{ab}$, $e_{bc}$ and $e_{ca}$ from each system are phase shifted and summed to provide two single signals $e_x$ and $e_y$ whose phase shift from a reference signal derived from the cursor coil excitation is a linear function of cursor coil displacement along the X and Y axis respectively.

The phase shifting is accomplished by a passive network connected to the three grid winding terminals.

In the case of a three terminal grid winding, the system can be likened to a three phase system with the phase shifted voltages $e_{ab}$, $e_{bc}$ and $e_{ca}$ corresponding to the phase voltages of a three phase system.

The system disclosed is not limited to a three phase system. It is generally applicable to polyphase systems using a multi-terminal grid winding in which the number of phases is equal to the number of grid winding terminals, and is an odd integer greater than one.

5 Claims, 14 Drawing Figures

POLYPHASE DIGITIZER

CROSS REFERENCE TO RELATED APPLICATION

The present application is a continuation-in-part of U.S. application Ser. No. 530,560, filed Sept. 9, 1983, by Leonard Robin Hulls, entitled Polyphase Position Determining System, abandoned.

BACKGROUND OF THE INVENTION

In the simplest concept a two dimensional digitizer consists of a movable cursor coil and a system of grid wires so arranged that the voltage induced in the grid wires by the cursor (or vice versa) is a function of the position of the cursor coil relative to the grid wires.

In most systems the grid wires are connected to form a single continuous convoluted winding with the induced voltage being produced between the two ends of the winding.

The grid wires are usually mounted just beneath or contained within a flat surface which is referred to as a digitizing tablet. The graphical material to be digitized is placed upon the surface of the tablet and the cursor coil is positioned as required to digitize the information. The process of digitizing involves producing two electrical signals (X and Y), which possess a measurable property (amplitude, frequency or pulse width), which is in known relationship to the XY co-ordinates of the cursor position with reference to some pre-defined cartesian co-ordinate system.

In most practical implementation the X and Y co-ordinates are obtained using two identical othogonal systems. The system is ideally only sensitive to changes in position along a single axis arranged to be the X axis for one system and Y axis for the other.

In practice, it is impossible to produce two completely independent orthogonal systems because of edge effects which manifest themselves as the cursor coil approaches the edge of the tablet. These errors can be minimized by restricting the cursor from operating near the tablet edge and/or providing error compensation (soft ware or hard ware) for the edge effect.

For example, a compensating signal can be introduced into the X co-ordinate signal based upon the Y co-ordinate information (which signifies how close the cursor is to the edges of the tablet which run parallel to the X axis).

An extensive discussion of an automatic coordinate determining device of the type involved in the present application appears in U.S. Pat. Nos. 3,647,963 and 3,801,733. Discussion of a modified form of coordinate determining device in which a slowly varying difference signal is employed appears in U.S. Pat. No. 3,735,044. The technical description contained in these patents is incorporated into this application as background information to the same extent as if fully set forth herein.

In a typical position-measuring device of the digitizer type, the alternating current excitation signal applied to the cursor is preferably 3 kHz, and it may be assumed for the purposes of the present application that 3 kHz is the frequency of the excitation signal applied to the cursor.

SUMMARY OF THE INVENTION

A principal object of the present invention is to provide a position-determining system having a simplified grid winding.

Another object is to provide a self-compensating system which uses a very simple phase shifting network.

Another object is to provide a simple phase shifting circuit which employs only passive elements.

Another object is to provide a position-determining system which is self-compensating for end-turn effect, and hence does not require additional circuitry for end-turn compensation.

These and other objects are achieved by providing a poly-phase digitizing system, preferably a three-phase digitizing system.

The three-phase digitizer position-determining system described in this application offers a number of advantages, as follows, over the two-phase system which is presently being used:

(1) The three-phase system described is self compensating and does not require the end turn compensation which is required on two-phase systems.
(2) The elimination of compensation windings simplifies the grid winding.
(3) The three-phase system uses a very simple phase shifting network.
(4) For the same number of conductors, the distance between position cycles is increased (e.g. for a 1 cm wire spacing the two-phase system repeats every 4 cm and the three-phase system every 6 cm.)
(5) The three-phase system produces a higher output signal.
(6) The three-phase system requires only one connection per phase between the electronic circuitry and the digitizer tablet.

DETAILED DESCRIPTION OF THE PREFERRED EMBODIMENTS

General

Polyphase position determining is applicable to systems where position is a function (preferably linear) of the difference in phase shift between an AC signal and a reference signal of the same frequency. The frequency of the AC signal corresponds to the excitation frequency of the system. Although either grid windings or cursor coil may be used for excitation, it is more convenient to excite the cursor coil. In a polyphase system the grid winding for a single co-ordinate consists of a single three terminal winding and the outputs available from these several terminals are combined to provide the desired signal whose phase shift, relative to a reference signal, is a function of position. If the cursor coil is excited, then the X and Y signals are simultaneously available at the two grid windings. If, instead of exciting the cursor coil, the grid windings are to be excited, then the X and Y grids must be excited in sequence and the value of the signal induced in the cursor coil committed to some form of memory storage. Thus, it will be seen that excitation of the grid increases the complexity and encumbers the system design. Consequently, the excited cursor system is the preferred arrangement.

The Two-Phase Positioning System

Figure 1:
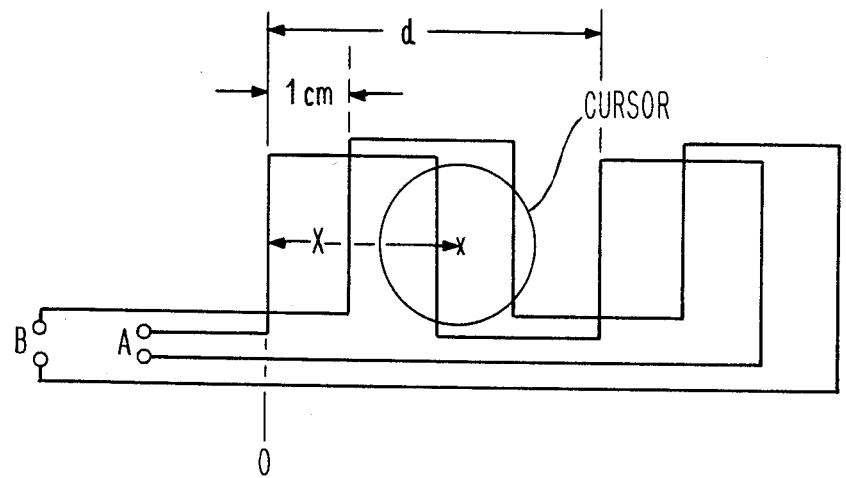
FIG. 1 is a schematic diagram showing the two convoluted windings of a two-phase position determining system.

In the case of the two-phase system, as illustrated in FIG. 1, two convoluted windings A and B are used. Each convolution repeats, for example, every 4 cm. The B winding is displaced 1 cm from the A winding, in the example shown in FIG. 1.

The output voltages $V_A$ and $V_B$ appears respectively across the A and B windings as a result of an AC excited cursor coil spaced distance X from the reference axis OY.

$$V_A = \sin X \sin \omega t$$

$$V_B = \cos X \sin \omega t$$

where $\omega$ is the angular frequency of the AC current in the cursor coil and the coupling has been assumed to be of such a value that the maximum amplitude of $V_A$ and $V_B$ is unity.

If $V_A$ is shifted 90° to give $V'_A$ then $$V'_A = \sin (2\pi X)/4 \cos \omega t$$

and $$V'_A + V_B = \sin (\omega t + (2\pi X)/4),$$

thereby providing a voltage which has the desired property (i.e. the phase is proportional to the displacement X).

In practice, the phase shift is normally achieved using RC circuits to shift one signal $+45°$ and the other $-45°$. The net result is a signal reduction of $1/\sqrt{2}$.

The Three Phase Position Determining System

Figure 2:
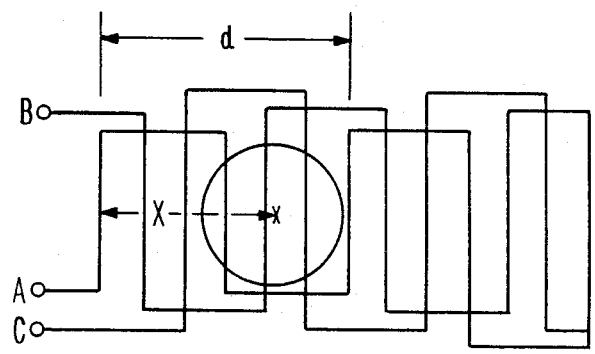
FIG. 2 is a schematic diagram showing the three terminal winding of a three-phase position determining system.

In the case of the three phase system, a single three terminal winding is used as shown in FIG. 2, according to my invention.

As in the two-phase system of FIG. 1, the spacing between adjacent conductors in FIG. 2 is one centimeter (1 cm.). Hence, in the three-phase system of FIG. 2, the pitch of each of the three conductors having terminals A, B and C is six centimeters (6 cm.).

Figure 3:
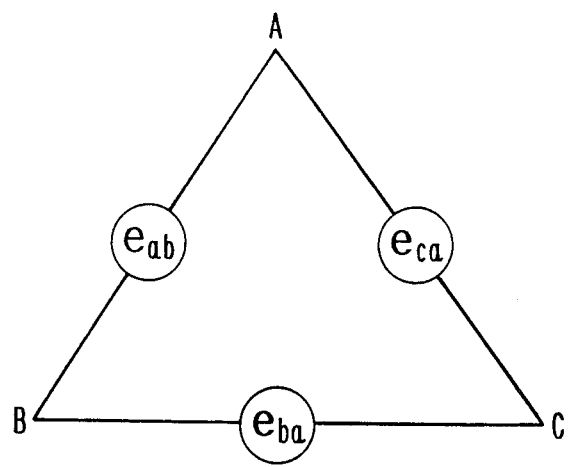
FIG. 3 shows the closed form of the equivalent circuit of the three phase winding.

The winding is shown in delta equivalent configuration in FIG. 3 as three interconnected voltage sources.

Figure 4:
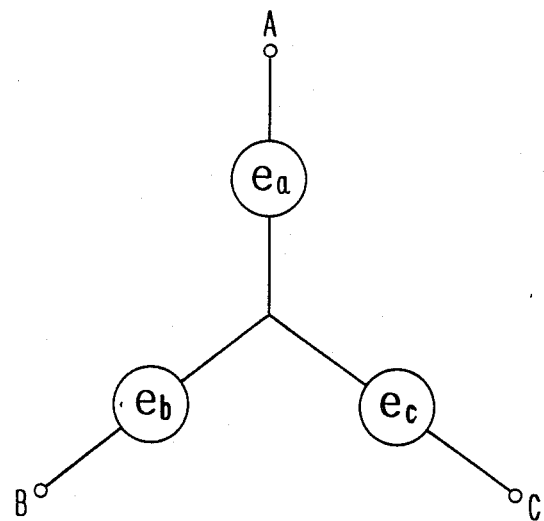
FIG. 4 shows the open form of the equivanent circuit of the three phase winding.

For analytical purposes it is more convenient to describe the system in terms of the Y equivalent circuit shown in FIG. 4

Where $$e_{ab} = e_a + e_b$$

$$e_{bc} = e_b + e_c$$

and $$e_{ca} = e_c + e_a$$

The value of voltage sources $e_a$, $e_b$, and $e_c$ when the cursor coil is positioned x centimeters from the first grid conductor connected to the A terminal is given by:

$$e_a = \sin \frac{2\pi X}{6} \sin\omega wt$$

$$e_b = \sin \frac{2\pi X}{6} + \frac{2\pi}{3} \sin\omega wt$$

$$e_c = \sin \frac{2\pi X}{6} + \frac{4\pi}{3} \sin\omega wt$$

In the case of the three-phase system, the signal with phase shift proportional to displacement is derived by displacing $e_a$ through 0°, $e_b$ through 120° ($2\pi/3$) to give $e'_b$ and $e_c$ through 240° ($4\pi/3$) to give $e'_c$.

The composite signal is then given by:

$$e_a + e_b' + e_c' = 1.5 \cos \left( wt + \frac{2\pi X}{6} \right)$$

Thus, it will be seen that both the two-phase and three-phase systems provide signals whose phase shift relative to a reference signal is proportional to displacement X. The three-phase system provides a 50 percent increase in output, and cycles over a 50 percent longer interval, i.e. 6 cm as compared with 4 cm for two-phase. In fact, any polyphase system will provide a signal whose phase shift relative to a reference signal, is proportional to displacement.

FIG. 2 shows the three-phase grid winding with its terminals A, B, and C. I have discovered that only three terminals are needed.

Figure 5:
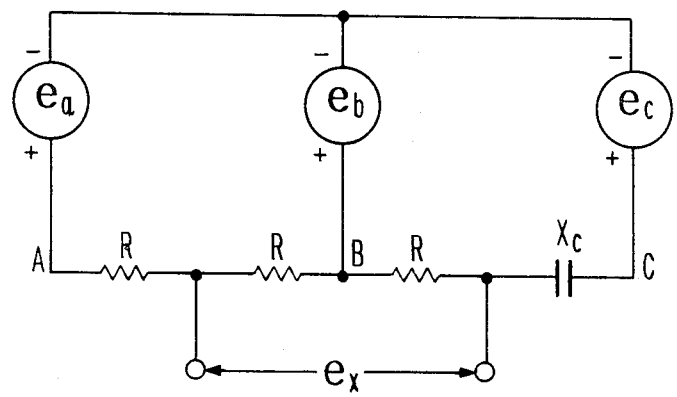
FIG. 5 is a simplified schematic diagram of the windings and the associated phase shifting network, with the grid winding resistances being omitted.

FIG. 5 shows the simplified grid winding equivalent circuit (winding resistance omitted) connected to its associated phase shifting network.

The output voltage is readily computed by adding the contributions from each voltage source independently. This is done by solving for the voltage source of interest with the other two sources replaced by a short circuit.

Thus—

$$e_x = \frac{e_a \times R}{2R} + \frac{e_b R}{R + X_c} - \frac{e_b R}{2R} - \frac{e_c R}{R + X_c}$$

Equation (1)

$$= \frac{R}{2R(R + X_c)} e_a(R + X) + e_b(R - X) - e_c 2R$$

To achieve the required 60° phase lead and lag for $e_a$ and $e_b$ respectively, $X_c$ must be set equal to $\sqrt{3}R$. Therefore, $$e_o = \frac{1.5}{2} \cos\left(\omega t - \frac{2\pi X}{6}\right)$$

$$= .75 \cos\left(\omega t - \frac{2\pi X}{6}\right)$$

It will be noted that half the maximum signal has been lost in the phase shifting network. In terms of signal magnitude after phase shifting, the three-phase system signal is only slightly greater than the signal from the two-phase system, i.e., 0.75 compared to $1/\sqrt{2} = 0.707$ Compensation of the end turns is not needed in a three-phase system because the signals induced in the end turns sum to zero. This is my discovery.

Suppose for some arbitrary position of the cursor the voltage induced in the end turns is $e_e$.

Then Equation (1) can be re-written as follows—

$$e_x = \frac{R}{2R(R + X_c)} \{(e_a + e_e)(R + X_c) +$$

$$(e_b + e_e)(R - X_c - (e_a + e_e) 2\}$$

$$= \frac{R}{2R(R + X_c)} \{e_a(R + X_x) + e_b(R - X_c) - e_c 2R\}$$

Figure 6:
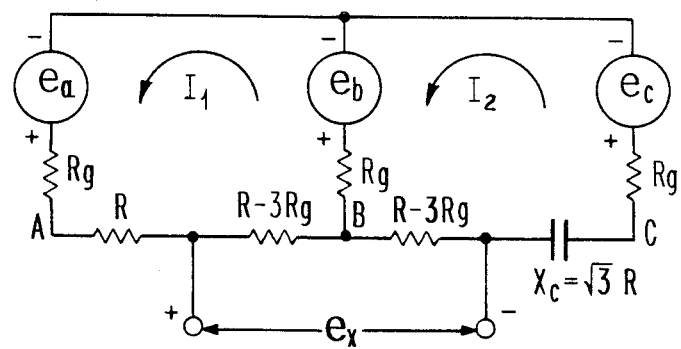
FIG. 6 shows the phase shift circuit with values appropriately selected to compensate for the grid resistance.

The ideal phase shift circuit of FIG. 5 neglects the impedance of the grid winding itself. The circuit has no active elements; only passive elements. Measurements show that the inductance of the grid is negligible compared with the resistive impedance. FIG. 6 shows the same phase shift circuit as in FIG. 5 with values appropriately selected to compensate for the grid resistance $R_g$. This circuit assumes identical grid winding resistance. In practice, if the grid resistances were not equal it would be necessary to add resistance in two grids to equalize them.

The output voltage e is given by—

$$e_x = (I_1 + I_2)(R - 3R_g)$$

$I_1$ and $I_2$ can be obtained by solving the following two network equations—

$$I_1 (2R - 2g) - I_2 R_g + (e_b - e_a) = 0$$
$$-I_1 R_g + I_2 (R - R_g + X_c) + (e_c - e_b) = 0$$

Equation 2.

$$I_1 \frac{\begin{vmatrix} -R_g & e_b - e_a \\ R - R_g + X_c & e_c - e_b \end{vmatrix}}{\begin{vmatrix} 2R - R_g & -R_g \\ -R_g & R - R_g + X_c \end{vmatrix}}$$

$$I_2 = \frac{\begin{vmatrix} e_b - e_a & 2R - R_g \\ e_c - e_b & -R_g \end{vmatrix}}{\begin{vmatrix} 2R - R_g & -R_g \\ -R_g & R - R_g + X_c \end{vmatrix}}$$

$$e_x = (R - 3R_g)(I_1 + I_2) = \frac{R - 3R_g}{2R^2 - 3RR_g + X_c(2R - R_g)} \times$$

$$\{e_a(R + X_c) + e_b(R - X_c) - e_c 2R)\}$$

If $X_c$ is set equal to $\sqrt{3} R$ —

$$e_x =$$

$$\frac{(R - 3R_g) R}{16R^2 - 24RR_g + 12R_g^2} |e_a(1 + \sqrt{3} j) + e_b(1 - \sqrt{3} j) - e_c 2|$$

Equation 2 shows that the desired relative phase shift between the three voltages $e_a$, $e_b$ and $e_c$ is achieved and is independent of the value of $R_g$.

The amplitude of the AC voltages between individual pairs of grid winding terminals vary sinusoidally with displacement of the cursor along the given direction except when the edge effect becomes predominant.

In an n phase system, the grid winding has n terminals and the AC output voltages between terminal pairs 1 and 2, 2 and 3, . . . (n−1) and n are defined as $e_{12}$, $e_{23}$ . . . $e(n-1)n$ respectively.

In describing the system it is convenient to use the star equivalent circuit of the voltage sources shown in FIG. 4 in preference to the closed equivalent shown in FIG. 3 which relates the voltage sources directly to the voltages appearing between individual terminal pairs.

The star equivalent voltage sources are defined as:

$$e_1, e_2 \ldots e_n$$

If the direction is defined as the X axis and $x = 0$ as the x co-ordinate of the grid conductor connected to terminal "1", then the amplitude of the voltage $e_1$ is given by $$A \sin (2\pi x)/d$$

where "x" is the displacement from the origin. The quantity "d" defines the periodic distance of the amplitude function (i.e. every time "x" changes through a distance "d", the argument of the amplitude function changes through $2\pi$ radians or 360 degrees).

The signal $e_1$ is then completely described by:

$$A \sin (2\pi x)/d \cdot \sin \omega k$$

where I cos wt is the excitation current in the cursor coil and $A = kI$, where "k" is the coupling factor between the cursor coil and the grid wire and I is the amplitude of the AC current flowing in the cursor coil.

In a polyphase system where "n" equals the number of phases, there are "n" terminals and "n" voltages ($e_1$, $e_2$ . . . $e_n$) for each of the two orthogonal positioning systems.

For the X co-ordinate, these "n" voltages can be written as follows—

$$e_1 = A \sin \frac{2\pi x}{d} \sin \omega t \qquad \text{Phase 1.}$$

-continued $$e_2 = A \sin 2\pi \left( \frac{x}{d} + \frac{1}{n} \right) \sin \omega t \quad \text{Phase 2.}$$

$$e_3 = A \sin 2\pi \left( \frac{x}{d} + \frac{2}{n} \right) \sin \omega t \quad \text{Phase 3.}$$

The general formula for the voltage from the $p^{th}$ phase is given by—

$$e_p = A \sin 2\pi \left( \frac{x}{d} + \frac{(p-1)}{n} \right) \sin \omega t \quad \text{Phase p}$$

The desired signal is obtained by phase shifting and adding the individual phase signals.

The rule for doing this is to shift the phase of each signal by an amount equal to the positional phase shift and leave the amplitude unchanged.

The phase shift for the first three phases will be as follows—

| Phase | Shift |
|-------|-------|
| 1 | 0 |
| 2 | $2\pi/n$ |
| 3 | $4\pi/n$ |

The desired signal can be expressed by the following summation—

$$\sum_{p=1}^{p=n} A \sin 2\pi \left( \frac{x}{d} \frac{p-1}{n} \right) \sin \left( wt + \frac{2\pi(p-1)}{n} \right)$$

The proof of the above statement for the general case is quite difficult. However, the correctness is illustrated by the following specific example calculations applied to a three-phase system.

The Three-Phase System (continued)

A complete three-phase system consists of two three terminal grid winding, each providing three voltages $e_a$, $e_b$, and $e_c$. The value of the voltage sources for the Y equivalent circuit is given by:

$$e_a = K \cos \frac{2\pi x}{d} = K \cos \frac{360x}{d} \quad (1)$$

$$e_b = K \cos \left( \frac{2\pi x}{d} + \frac{2\pi}{3} \right) = K \cos \left( \frac{360x}{d} + 120 \right) \quad (2)$$

$$e_c = K \cos \left( \frac{2\pi x}{d} + \frac{4\pi}{3} \right) = K \cos \left( \frac{360x}{d} + 240 \right) \quad (3)$$

K is a constant which is a function of the following: (1) cursor height, (2) cursor coil turns, (3) cursor coil diameter, (4) grid winding pitch, and (5) excitation frequency.

In most of the analysis that follows it is convenient to let $K = 1$ to simplify the analysis. The significance of the grid winding pitch "d" is illustrated in FIG. 2.

X defines the distance between the cursor coil center and the arbitrarily defined datum line. It is convenient to define the datum line as the first conductor connected to the A terminal as shown in FIG. 2.

Thus when $x = d/4$ the phase voltages are given by:
$e_a = 1$
$e_b = -0.5$
$e_c = -0.5$ The effect of the phase shifting network is to produce a single signal precisely identical to that which would be obtained by shifting the three voltages as follows and then summing them together:
$e_a$ zero
$e_b$ 120° (which corresponds to a distance equal to to $\frac{1}{3}d$).
$e_c$ 240° (which corresponds to a distance equal to $\frac{2}{3}d$).

Figure 7:
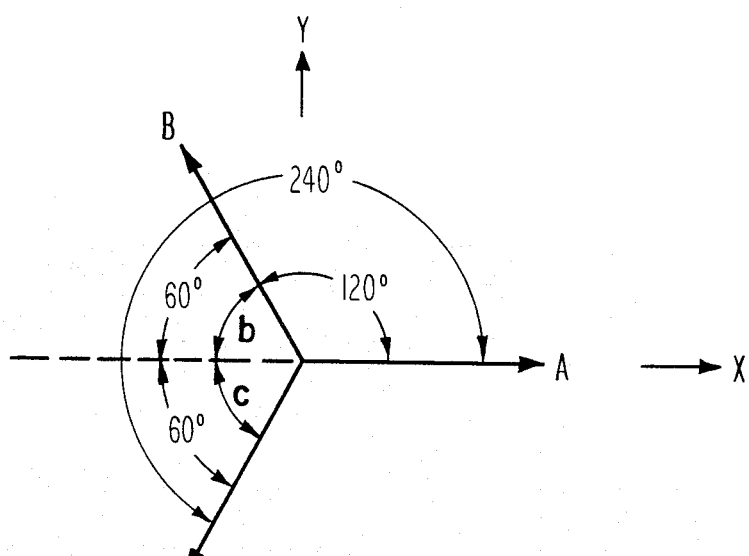
FIG. 7 is a vector diagram showing the three vectors of the three-phase voltages.

In a position sensing system, the requirement is to combine three voltages so that they produce a signal whose phase shift relative to a reference signal derived from the cursor excitation is a linear function of the displacement "x". This is equivalent to setting up three vectors A, B, and C, where the length of each vector is equal to the corresponding phase voltabe $e_a$, $e_b$, and $e_c$. The angular displacement of these three vectors is made equal to the corresponding shifts between the phase windings, as shown in FIG. 7. The desired resultant voltage, which has constant amplitude and phase shift relative to the reference proportional to displacement, is represented by the vector sum of A, B, and C.

This concept can be extended to any number of phases, each phase corresponding to a terminal pair of an n terminal grid winding on the digitizer surface.

In the case of the three-phase system, the amplitude and phase of the resultant when $x = d/4$ can be determined by inspection. When $x = d/4$ vectors B and C are negative with 0.5 magnitude. Thus, they produce zero component in the Y direction and $2 \times 0.5 \cos 60$ in the X direction. (see FIG. 7). $2 \times 0.5 \times \cos 60 = 0.5$.

Adding this to the A vector (which is of unit length) gives a resultant vector with zero phase shift (parallel to the X axis) and amplitude equal to 1.5.

It can readily be shown that for any other value of x the amplitude remains unchanged at 1.5 and only the phase difference changes.

Figure 8:
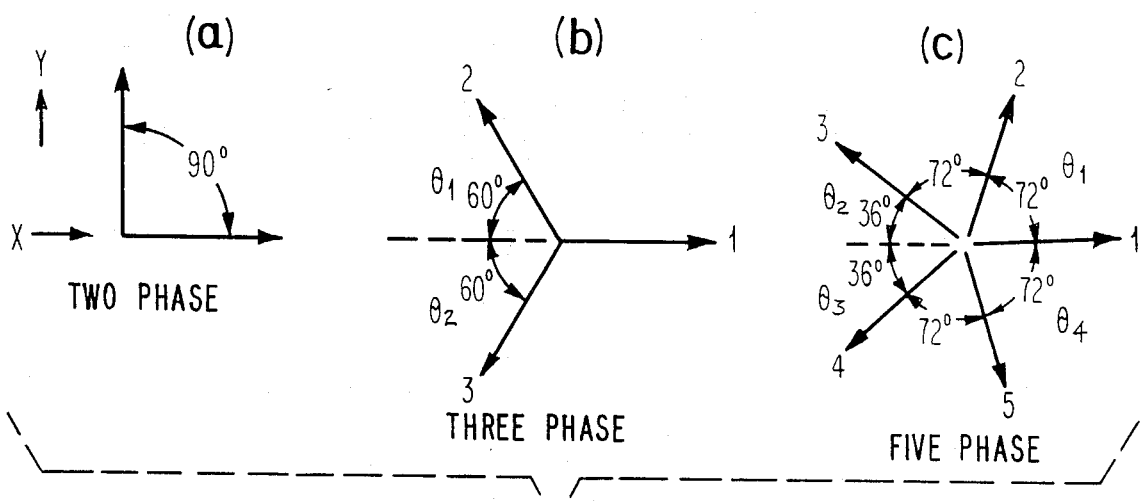
FIGS. 8(a) 8(b) and 8(c) are diagrams illustrating in vector form the way in which the grid winding voltages are combined in a two-phase, three-phase and five-phase system.
Figure 9:
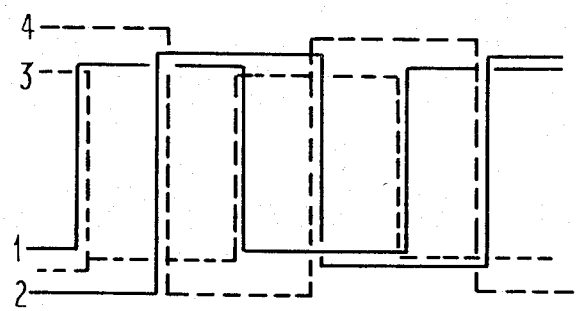
FIG. 9 is a schematic diagram illustrating the grid wires for a four-phase system.

The diagrams in FIG. 8. illustrate in vector form the way in which the voltages are combined in a 2-phase, 3-phase and 5-phase system. With the exception of the two-phase system, even phase arrangements are not convenient forms for practical purposes. The reason for this inconvenience is because even phase systems for four or more phases, involve coincident grid wires as shown for a 4-phase system in FIG. 9.

It is interesting to note that any polyphase system of more than two phases is self compensating for the end turn effect.

To compute the amplitude of the polyphase system, it is convenient to assume the displacement x is d/4 and therefore the Y components for all vectors sum to zero. This is a valid assumption because the amplitude is independent of displacement and therefore the choice of x for the computation is arbitrary.

|  | Phase | Amplitude | X component | Resultant |
|---|---|---|---|---|
| Two Phase | 1 | 1 | 1 | 1 |
|  | 2 | 0 | 0 |  |
| Three Phase | 1 | 1 | 1 |  |
|  | 2 | −0.5 | +.25 | 1.5 |
|  | 3 | −0.5 | +.25 |  |
| Five Phase | 1 | 1 | 1 |  |

-continued

| Phase | Amplitude | X component | Resultant |
|---|---|---|---|
| 2 | .309 | .0955 | |
| 3 | −.809 | .654 | 2.5 |
| 4 | −.809 | .654 | |
| 5 | .309 | .0955 | |

Thus, it will be seen that assuming the maximum output from any one grid winding is of unit amplitude, then the amplitude of the resultant signal is 0.5 multiplied by the number of phases.

In accordance with one aspect of the present invention, the phase shift is achieved by a novel phase shift network illustrated in FIGS. 5 and 6. As previously indicated, this network has no active element. It comprises solely passive elements. The network shown in FIG. 5 omits the grid resistances $R_g$ and may be described as follows:

One terminal A of a three terminal voltage source is connected to terminal B of the source by a first resistance R connected in series with a second resistance R, the two resistances being of equal value. The said terminal B of said voltage source is connected to terminal C of the voltage source by a third resistance R connected in series with a capacitance. The value of the capacitance is such that, at the frequency of the induced voltages, its reactance $X_c$ is equal to the square root of 3 multiplied by the resistance R. The single output signal whose phase shift relative to a reference signal, is proportional to the displacement of the cursor, is taken across the second and third resistances R.

As previously indicated, FIG. 6 differs from FIG. 5 in that in FIG. 6 the grid resistances $R_g$ are indicated. In the network of FIG. 6, the first resistance R has a value R but the second and third resistances each have a value $R-3R_g$. As in the network of FIG. 5, the output is taken across the second and third resistances.

The system discussed in detail in the foregoing discussion relates to the grid structure along one of the two axes of the digitizer, for example, along the X axis. An identical grid structure is provided for the Y axis.

Figure 11:
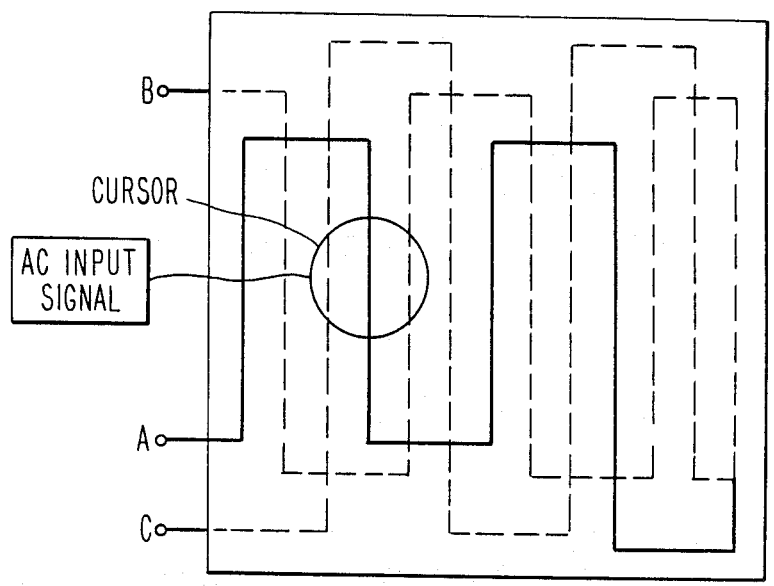
FIG. 11 is an enlarged top plan view looking down along the line 11—11 of FIG. 10 illustrating diagrammatically a portion of the tablet of FIG. 10 having a three-phase grid structure on the X axis.

FIG. 11 is an enlarged top plan view illustrating diagrammatically a portion of the surface of a digitizer tablet having a grid structure along the X axis which is the same as that shown in FIG. 2.

Figure 12:
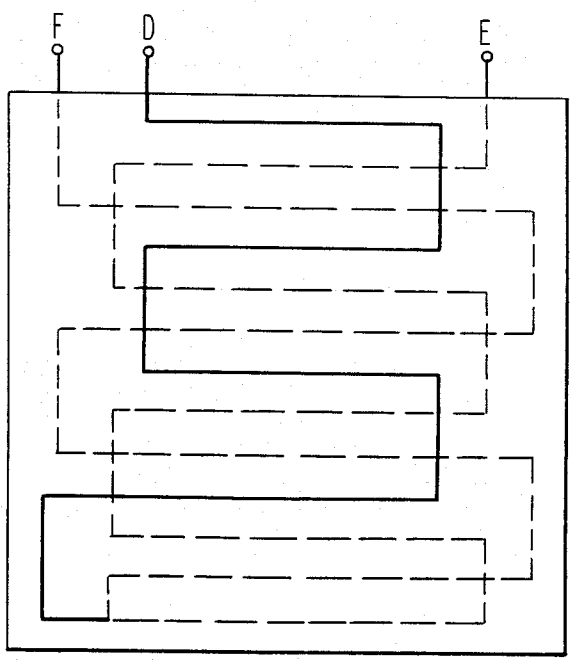
FIG. 12 is a view looking down along the line 12—12 of FIG. 10 illustrating diagrammatically and enlarged a portion of the tablet of FIG. 10 having a three-phase grid structure on the Y axis.

FIG. 12 is an enlarged plan view similar to FIG. 11 but illustrating diagrammatically a portion of a grid structure along the Y axis which is orthogonal relative to the X axis. Except for orientation, the two grid structures are identical.

Figure 10:
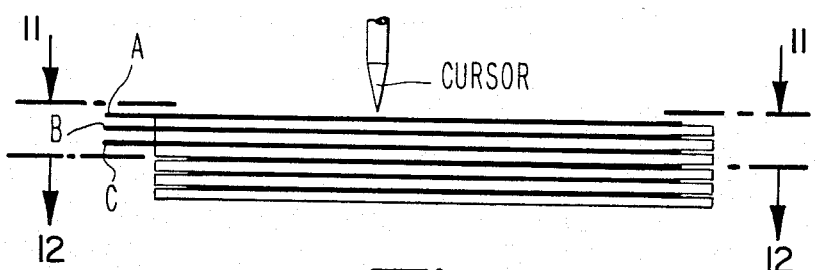
FIG. 10 is an elevational diagrammatic illustration in section of a digitizer tablet having a six-layer grid structure, the thickness shown being exaggerated.

FIG. 10 is an elevational diagrammatical view of the digitizer tablet illustrating a grid structure having six layers, three for each of the two grid structures, A, B, C and D, E, F. The illustration in FIG. 10 is of exaggerated thickness in order to illustrate six layers. It will be understood that insofar as area of the tablet is concerned, the grid structures illustrated in FIGS. 11 and 12 show only one-and-a-fraction cycles, whereas the full tablet may have of the order of fifty cycles.

While, in FIG. 10, a six-layer laminated structure has been shown, a laminated structure is not essential; the conductors could be in a single layer and insulated from each other at cross-over points.

What is claimed is:

1. Apparatus for determining position coordinates of points on a surface, said apparatus including:
   (a) two conductive grid-structure systems orthogonally positioned relative to each other;
   (b) a cursor structure having a conductive coil element positioned to be freely moved in close cooperative relationship parallel to the grid-structure systems;
   (c) each of said orthogonally-disposed systems comprising a single multi-terminal conductive grid structure having a datum line and having 'n' terminals on said grid structure, including terminals A, B and C, where 'n' is an odd integer greater than one, said grid structure comprising a plurality of substantially equally-spaced parallel grid conductors located parallel to said surface, with adjacent conductors of said parallel grid structure being connected to different terminals, each of said conductor having its one end which is remote from its terminal electrically connected to a corresponding remote end of each other of said conductors, said parallel grid conductors being at right angles to a first axis of said surface,
   (d) input means for applying to said cursor coil an alternating current excitation signal for inducing signal voltages in said grid conductors; and
   (e) phase-shift network means for phase shifting the induced signal voltages present at the 'n' terminals of the grid structure and for combining said phase-shifted signal voltages to produce a single signal the phase shift of which relative to a reference signal derived from the cursor excitation signal is a function of the displacement of said cursor coil from said datum line along said first axis of said surface.

2. Apparatus according to claim 1 wherein "n"=3.

3. Apparatus according to claim 2 wherein said phase-shift network means shifts the voltages induced between terminal pairs AB, BC and CA of terminals A, B, and C and combines them into a single voltage equal to the sum of an open form equivalent circuit voltage $e_a$ shifted 0 degrees and an open form equivalent circuit voltage $e_b$ shifted 120 degrees and an open form equivalent circuit voltage $e_c$ shifted 240 degrees.

4. Apparatus according to claim 3 wherein said phase-shift network means for shifting the induced voltages and for combining said phase shifted voltages to produce a single signal comprises a capacitance having a reactance $X_c$ equal to R multiplied by square root of 3, means connecting grid winding terminal A or B or C to a different grid winding terminal through a first resistance R in series with a second resistance R, means connecting a third different terminal to said second terminal through said capacitive reactance $X_c$ in series with a third resistance R, and means for developing said single signal across said second resistance R and said third resistance R, said first resistance R, said second resistance R, and said third resistance R, all being of equal value.

5. A passive phase shift network for combining the phase shifting the alternating voltages induced between terminals A, B, and C of a grid structure comprising a plurality of substantially equally-spaced grid conductors located parallel to a surface with adjacent conductors connected to different terminals and remote ends of said conductors connected together, said network comprising means connecting a first terminal A to a second terminal B through a first resistance R in series with a second resistance R, means connecting a third terminal C to said second terminal B through a capacitance connected in series with a third resistance R, each of said first, second and third resistances R being of equal value, said capacitance having a value such that its capacitive reactance at a frequency of said alternating voltage is equal to R multiplied by square root of 3, and means for developing an output signal across said second and third resistances.

* * * * *